Patented Mar. 13, 1923.

1,448,281

UNITED STATES PATENT OFFICE.

BRUNO REWALD, OF HAMBURG, GERMANY, ASSIGNOR, BY MESNE ASSIGNMENTS, TO THE CHEMICAL FOUNDATION, INC., A CORPORATION OF DELAWARE.

PROCESS FOR THE MANUFACTURE OF MEAT-EXTRACTLIKE PREPARATIONS.

No Drawing. Application filed June 6, 1919. Serial No. 302,368.

*To all whom it may concern:*

Be it known that I, BRUNO REWALD, citizen of the German Republic, residing at Hamburg, Germany, have invented new and useful Improvements in a Process for the Manufacture of Meat-Extractlike Preparations (for which I have filed applications in Germany, March 26, 1918; Austria, June 3, 1918; Hungary, June 6, 1918), of which the following is a specification.

The object of the present process is the manufacture of meat-extractlike preparations. For some time it has been known that the amino acids are, as it were, the carriers of the meat-like taste. Based on that fact a manufacturing industry has recently originated, the object of which is to decompose or break up albumenoid matter with the formation of amino acids. Owing to the high price of meat and the comparative scarcity of easily digestible albumen, I started experiments with a raw material of low price, viz—animal refuse, like horn, claws, hair and other matter containing keratin, which by long continued boiling with mineral acids yield amino acids, as is well known. However, I have found that besides the amino acids sulphur compounds are produced as a by-product that possess a nauseous taste and bad smell, which make the solutions of amino acids thus obtained useless for human food.

These sulphur compounds are not produced in hydrolyzing other albumen matter, like casein, yeast, meat or the like. Former investigators assumed that the sulphur compounds, which were termed "cystins" were obtained in a liquid state and mixed with the hydrolyzed solutions of albumenoid matter. Suggestions were therefore made to drive out the sulphur compounds by live steam or by oxidation. All the methods yielded a bad result and as a consequence the hydrolysis of albumenoid matter, like keratin, was only carried to the formation of albumoses and peptones, which did not give rise to the formation of sulphur compounds having a nauseous taste and bad smell.

The present invention is based on new observations I made on the nature and properties of the compounds produced by the hydrolysis of keratin containing matter. I have found, that the objectionable sulphur compounds are combined with the amino acids very loosely and can be separated from the solutions in the form of gases. The usual means for removing gases from solutions, for example, the repeated boiling down of the solutions do not avail in the present instance. However, I have found, that a removal of the gases sufficient for all practical purposes can be gained by treating the solutions containing amino acids and prepared by the complete hydrolysis of keratin, with carbon of high gas absorbing power. Such carbon possesses a singular selective absorbing capacity for the sulphur compounds by splitting their combination with the amino acids, while at the same time absorbing the sulphur compounds. The amino acids are left behind free from the objectionable by-products. That selective property of gas absorbing carbon for the sulphur compounds mentioned was totally unknown before. It has been proposed to treat solutions derived from the splitting up of albumen with coal for the sake of decolorization. The solutions of amino acids produced by the hydrolysis of keratin by means of continued boiling with acids have not been treated with gas absorbing carbon before, because the nature of those objectionable compounds as gases was not known before and consequently the application of gas absorbing coal could not be thought of. In connection herewith I may mention that the animal coal commonly used for decolorizing solutions of organic matter or solutions of albumoses and peptones is not applicable for the present purpose, because a decolorization of the solutions is not desirable, but is rather objectionable, as a matter of fact, since other compounds of useful nature are also removed thereby. For that reason I avoid a coal of high decolorizing power and take care to apply only coal of high gas absorbing power, which, as I said before, always possesses that selective capacity for the sulphur compounds. I have found that coal made from blood, which has the highest decolorizing power known is altogether unsuitable for the present purpose, the same may be said of wood charcoal.

The coal best suited is prepared from wood after having been saturated with zinc chloride or similar metallic chloride. The charcoal thus obtained is best granulated for my purposes.

In practice I carry out my invention by way of example as follows: 1000 kilos of a neutralized solution of hydrolyzed keratin are mixed with 10 kilos of a suitable gas absorbing coal. I stir the mass from time to time and allow to rest. Finally the solution is separated from the coal by means well known and boiled down.

I can also filter the hydrolyzed and neutralized solutions of keratin through several filters, filled with the granulated gas absorbing coal and standing side by side, provision being made that the solution after having passed one filter can be pumped on the top of another filter to be filtered over again, as long as such is necessary.

I can also add the gas absorbing coal to the mass before or during the hydrolysis of the keratin, whereby a separate filtration of the solution from the keratin matter not fully dissolved can be saved.

Having now described my invention what I claim as new and desire to secure by Letters Patent, is:

1. A process for the manufacture of meat-like preparations from keratin consisting in boiling keratin with mineral acids until the formation of amino acids, neutralizing the solutions obtained and degassing them by treating with carbon of high gas absorbing power, essentially as described.

2. A process for the manufacture of meat-like preparations from keratin consisting in adding carbon of high gas absorbing power, to the keratin, boiling the mixture of keratin and carbon with mineral acids until the formation of amino acids and neutralizing the solutions obtained, essentially as described.

In testimony whereof I have signed my name to this specification in the presence of two subscribing witnesses.

BRUNO REWALD.

Witnesses:
SIEGFRIED HAMBURGER,
ALBERT BOHR.